United States Patent [19]
Koudmani

[11] Patent Number: 5,572,691
[45] Date of Patent: Nov. 5, 1996

[54] APPARATUS AND METHOD FOR PROVIDING MULTIPLE DATA STREAMS FROM STORED DATA USING DUAL MEMORY BUFFERS

[75] Inventor: Rabee Koudmani, San Diego, Calif.

[73] Assignee: GI Corporation, Hatboro, Pa.

[21] Appl. No.: 47,541

[22] Filed: Apr. 21, 1993

[51] Int. Cl.[6] .................................................. G06F 12/02
[52] U.S. Cl. .................. 395/405; 395/250; 395/484; 395/873; 345/200; 345/201; 365/189.02; 364/DIG. 1; 364/238.6; 364/239.5
[58] Field of Search .................................. 395/400, 425, 395/164, 166, 250, 872, 873, 405; 365/189.02, 189.05; 345/200, 201; 358/401, 506, 13

[56] References Cited

U.S. PATENT DOCUMENTS

| | | | |
|---|---|---|---|
| 4,352,180 | 9/1982 | Schulze | 370/58 |
| 4,394,642 | 7/1983 | Currie et al. | 341/81 |
| 4,472,813 | 9/1984 | Koike et al. | 375/18 |
| 4,674,088 | 6/1987 | Grover | 370/100 |
| 4,728,930 | 3/1988 | Grote et al. | 340/347 |
| 4,791,598 | 12/1988 | Liou et al. | 364/725 |
| 4,807,121 | 2/1989 | Halford | 395/873 |
| 4,956,768 | 9/1990 | Sidi et al. | 395/873 |
| 5,007,001 | 4/1991 | Lloyed-Williams | 395/128 |
| 5,138,440 | 8/1992 | Radice | 358/13 |
| 5,163,132 | 11/1992 | Dulac et al. | 395/873 |
| 5,195,182 | 3/1993 | Sasson | 395/250 |
| 5,197,145 | 3/1993 | Kitamura et al. | 395/425 |
| 5,229,855 | 6/1993 | Siann | 358/183 |
| 5,249,292 | 9/1993 | Chiappa | 395/650 |
| 5,261,068 | 11/1993 | Gaskins et al. | 395/484 |
| 5,297,139 | 3/1994 | Okura et al. | 370/60 |
| 5,307,449 | 4/1994 | Kelley et al. | 395/119 |
| 5,371,877 | 12/1994 | Drako et al. | 395/436 |
| 5,377,265 | 12/1994 | Wettengel et al. | 380/9 |

OTHER PUBLICATIONS

D. T. Chi, "A New Block Helical Interleaver," Conference Record of MILCOM '92; Oct. 11–14, 1992, San Diego, CA, vol. 2/3, pp. 799–804.

*Primary Examiner*—Matthew M. Kim
*Assistant Examiner*—Hiep T. Nguyen
*Attorney, Agent, or Firm*—Barry R. Lipsitz; Ralph F. Hoppin

[57] ABSTRACT

An apparatus and method are disclosed for processing successive frames of data to provide a plurality of data streams containing the data in different orders. In an illustrated embodiment, two different data streams are output for incoming frames of video data. Pixels are grouped from an incoming current video frame to provide successive pairs thereof for storage in a first memory bank at a first clock rate $\phi$. Stored pixel pairs are read from a second memory bank containing a previous video frame at a second clock rate $2\phi$ while the pairs of pixels from the current video frame are being stored in the first memory bank at rate $\phi$. This provides two pairs of pixels from the previous video frame for each one pair of pixels stored from a current video frame. The pixel pairs from the previous video frame output from the second memory bank are combined into two data streams, each providing the pixels in a different order. The memory banks are alternated to process successive frames.

19 Claims, 5 Drawing Sheets

APPARATUS AND METHOD FOR PROVIDING MULTIPLE DATA STREAMS FROM STORED DATA USING DUAL MEMORY BUFFERS

BACKGROUND OF THE INVENTION

The present invention relates to the communication of digital data and more particularly to the processing of successive frames of digital information to provide a plurality of different data streams from each frame. The invention is particularly applicable to the communication of digital video signals, in which a plurality of different scanning formats are needed for different processing functions.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM (Sequential Color And Memory) standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data referred to as "pixels." A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal.

One of the most effective and frequently used classes of algorithms for video compression is referred to as "transform coders." In such systems, blocks of video are linearly and successively transformed into a new domain with properties significantly different from the image intensity domain. The blocks may be nonoverlapping, as in the case of the discrete cosine transform (DCT), or overlapping as in the case of the lapped orthogonal transform (LOT). Systems using the DCT are described in Chen and Pratt, "Scene Adaptive Coder", IEEE Transactions on Communications, Vol. COM-32, No. 3, Mar. 1984, and in U.S. Pat. No. 4,791,598 entitled "Two-Dimensional Discrete Cosine Transform Processor" to Liou, et al., issued Dec. 13, 1988. A system using the LOT is described in Malvar and Staelin, "The LOT: Transform Coding Without Blocking Effects," IEEE Transactions on Acoustics, Speech, and Signal Processing, Vol. 37, No. 3, April 1989.

Video transforms are used to reduce the correlation that exists among samples of image intensity (pixels). Thus, these transforms concentrate the energy into a relatively small number of transform coefficients. Most common transforms have properties that easily permit the quantification of coefficients based on a model of the human visual system. For example, the DCT produces coefficients with amplitudes that are representative of the energy in a particular band of the frequency spectrum. Therefore, it is possible to utilize the fact that the human viewer is more critical of errors in the low frequency regions of an image than in the high frequency or detailed areas. In general, the high frequency coefficients are always quantized more coarsely than the low frequencies.

The output of the DCT is a matrix of coefficients which represent energy in the two-dimensional frequency domain. Most of the energy is concentrated at the upper left corner of the matrix, which is the low frequency region. If the coefficients are scanned in a zigzag manner, starting in the upper left corner, the resultant sequence will contain long strings of zeros, especially toward the end of the sequence. One of the major objectives of the DCT compression algorithm is to create zeros and to bunch them together for efficient coding.

In order to reconstruct a video signal from a stream of transmitted coefficients, it is necessary to perform the inverse of the transform (e.g., DCT) that was used to encode the signals. Typically, the transform coefficients are communicated in n×n blocks of coefficients, such as 8×8 or 16×16 blocks. In order to inverse transform the coefficients, it is necessary to reorder them at the receiver, using the same block format scanning order (e.g., zigzag scanning) used at the transmitter.

It may also be desired to provide the received pixels in a different order, for example to enable processing in a "film mode" which requires line-by-line scanning instead of the block scanning used in DCT processing.

It is known to use two memory buffers in order to store frames of incoming digital video data before processing. Typically, the incoming video data for a current frame is stored in a first memory bank while the data from a prior frame is read out from a second memory bank. At the end of a frame, the buffers are swapped so that the memory bank that just received a frame of data will output that data and the other memory bank will receive the next frame of data. This technique is useful in converting the scanning format of the incoming video data to a format required for subsequent processing.

In cases where two different scanning formats are needed for different processing functions, additional memory banks have been provided. The provision of additional memory banks increases the memory and associated hardware requirements to a point that can render the system design rather complex and expensive.

It would be advantageous to provide a scheme for utilizing just two memory banks to support a plurality of different processing functions that require different scanning formats.

Such a scheme should provide a plurality of different output data streams based on the same received information without degrading system throughput.

The present invention provides a dual memory buffer scheme for outputting multiple data streams having the aforementioned advantages.

SUMMARY OF THE INVENTION

In accordance with the present invention, apparatus is provided for storing successive frames containing bytes of digital information and subsequently outputting N data streams for each frame. The bytes can be of any length (e.g., 8 bits) depending on the application. Each of the N data streams provides the bytes for the frame in a different order for subsequent processing. For example, where the frames are frames of video data (i.e., pixels) one data stream can provide the pixels for DCT processing in a block format and another data stream can provide the pixels for film mode processing on a line-by-line basis.

The apparatus comprises first and second memory banks for storing alternate frames. The first memory bank is adapted to store bytes from an incoming frame while the second memory bank outputs bytes from a previous frame, and vice versa. Means are provided for controlling the inputting and outputting of bytes to and from the first and second memory banks. The memory banks are responsive to read and write strobes and addresses provided by the controlling means for (i) storing incoming frame data in an order determined by write addresses at a rate of N bytes per write strobe and (ii) outputting N bytes of frame data specified by a read address for a next successive one of the N different data streams every read strobe. One write strobe occurs for every N read strobes. Means are provided for buffering the frame data output from the memory banks for each of the N different data streams to provide one byte per read strobe in each of the data streams.

The controlling means can comprise a write address generator and N read address generators for each memory bank. Means are provided for coupling the write address generator for a memory bank to address ports of the memory bank when the memory bank is receiving bytes from an incoming frame for storage. Means are provided for sequentially coupling the different read address generators for a memory bank to address ports of the memory bank when the memory bank is outputting bytes therefrom. Means can be provided for alternatingly coupling the buffering means to the first and second memory banks to process data from one frame at a time.

The buffering means can comprise N registers, each responsive to a respective enable signal generated by the controlling means for receiving N data bytes at a time output by the memory bank in response to a current read address. A data selector associated with each register sequentially outputs each of the N data bytes from the register in response to successive read strobes. Each data selector provides a continuous stream of data bytes in an order dictated by the read addresses that are current when the register associated with the data selector is enabled.

In an alternate embodiment, the buffering means comprise, for each of the memory banks, N registers coupled to the memory bank. Each register is responsive to a respective enable signal generated by the controlling means for receiving N data bytes at a time output by the memory bank in response to a current read address. A data selector associated with each register sequentially outputs each of the N data bytes from the register in response to successive read strobes. Means are provided for multiplexing the data bytes output from corresponding data selectors of the first and second memory banks. The multiplexing means output N continuous streams of data bytes. Each stream provides the data bytes in an order dictated by the read addresses that are current when the registers associated with the data selectors used to form the stream are enabled.

In a method in accordance with the present invention, successive frames of pixel data are processed to provide N data streams containing the pixel data in different orders. Incoming frames of pixel data are alternately stored in a first memory bank at a rate of N pixels per write cycle while pixel data of a previous frame is output from a second memory bank at a rate of N pixels per read cycle, and vice versa. The read cycle has a rate of N times the write cycle to provide N, N-pixel sets of output pixels per write cycle. The pixels output from the memory banks for each of the N sets are buffered to provide the N data streams. During each read cycle, the memory bank outputting pixel data is newly addressed to provide a set of N pixels for a next successive one of the data streams.

Apparatus is also provided in accordance with the invention for processing successive frames of pixel data to provide two data streams containing the pixel data in different orders. Means are provided for grouping pixels from an incoming current video frame to provide successive pairs of pixels for storage in a first memory bank at a first clock rate $\phi$. Means are provided for reading stored pairs of pixels of a previous video frame from a second memory bank at a second clock rate $2\phi$ while the pairs of pixels from the current video frame are being stored in the first memory bank at rate $\phi$. The reading means provide two pairs of pixels from the previous video frame for each one pair of pixels stored from the current video frame. Means are provided for combining the pairs of pixels provided by the reading means into two data streams. Each data stream provides the pixels from the previous frame in a different order.

The means for grouping pixels can comprise a latch for delaying pixels from the incoming video frame by one clock cycle. Means are provided for combining a delayed pixel from the latch with a next successive pixel in the incoming video frame to provide a pair of pixels.

The means for combining the pairs of pixels provided by the reading means into two data streams can comprise first and second output registers. Means are provided for inputting every other pair of pixels provided by the reading means into the first output register and for inputting the remaining pairs of pixels provided by the reading means into the second output register. Means are provided for retrieving pixels one at a time from the first output register to provide one of the two data streams. Means are provided for retrieving pixels one at a time from the second output register to provide the other one of the data streams.

The reading means can comprise an address generator coupled to provide separate addresses to the second memory bank at the second clock rate $2\phi$, thereby providing two different pairs of pixels from the previous video frame for each one pair of pixels stored from the current video frame. Switch means can be provided for alternatingly coupling the first and second memory banks to receive pixels for storage while the other memory bank outputs pixels.

In an alternate embodiment, the means for combining the pairs of pixels provided by the reading means into two data streams comprise separate registers associated with each of the memory banks. First and second output registers are coupled to receive pixels from the first memory bank. Means are provided for inputting every other pair of pixels output from the first memory bank into the first output register and for inputting the remaining pairs of pixels output from the first memory bank into the second output register. Third and fourth output registers are coupled to receive pixels from the second memory bank. Means are provided for inputting every other pair of pixels output from the second memory bank into the third output register and for inputting the remaining pairs of pixels output from the second memory bank into the fourth output register. Means are provided for retrieving pixels one at a time from the first and third output registers to provide one of the two data streams. Pixels are retrieved one at a time from the second and fourth output registers to provide the other one of the data streams.

DESCRIPTION OF THE PREFERRED EMBODIMENTS

Figure 1:
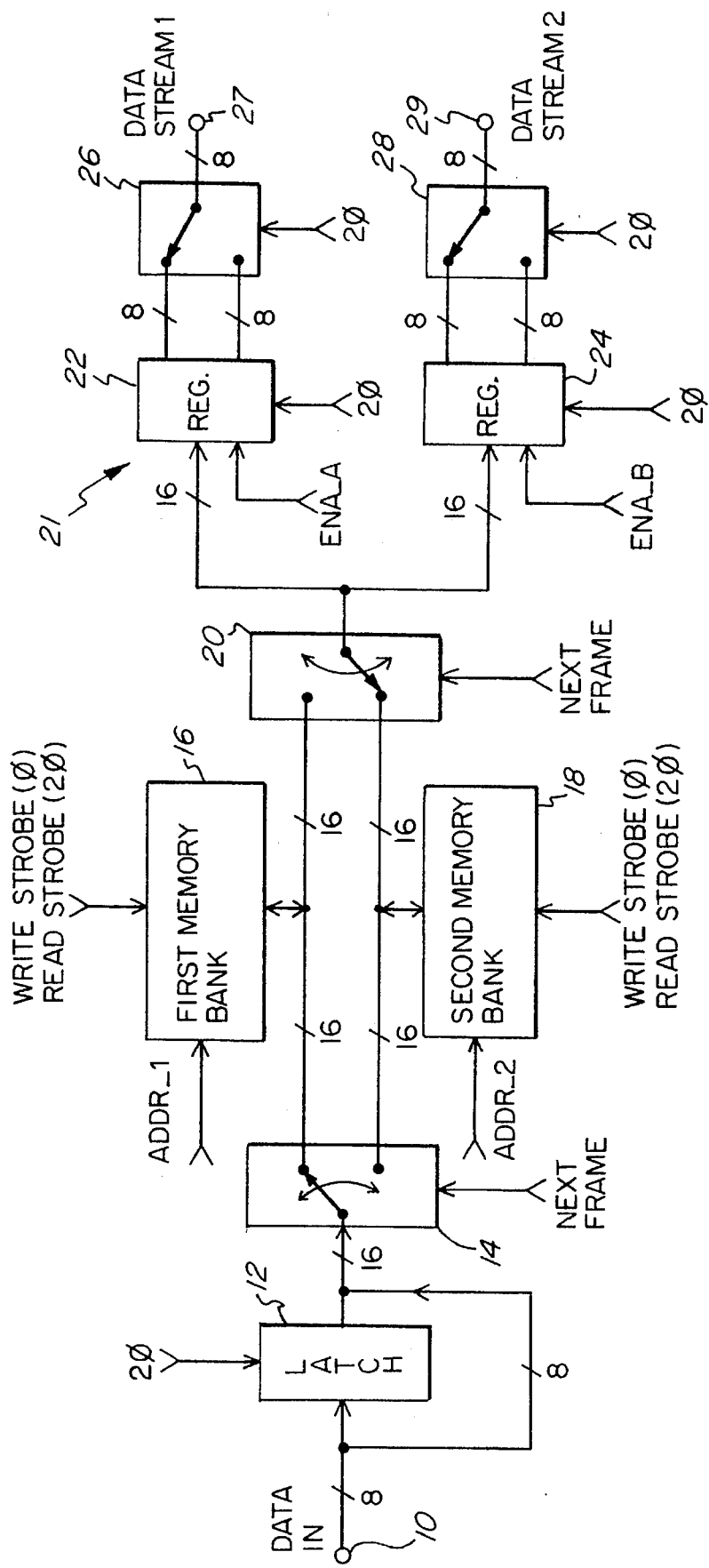
FIG. 1 is a block diagram of a first embodiment of a dual memory buffer scheme in accordance with the present invention that outputs two different data streams for each incoming frame of data.

The present invention enables the use of two memory banks and associated output buffers to store successive frames of digital information and output a plurality of data streams containing the digital information in different orders. A first embodiment of apparatus for implementing the invention is illustrated in FIG. 1. Incoming data, which for purposes of explanation can comprise pixels of successive digital video frames, is coupled via a data input terminal 10 to a latch 12. Latch 12 is clocked at a rate $2\phi$, which is twice the rate at which data is written into first and second memory banks 16, 18, respectively. In the illustrated embodiment, each pixel is eight bits in length. At the output of latch 12, a current eight-bit pixel from terminal 10 is combined with the previous eight-bit pixel which has been delayed by latch 12 to form a pair of pixels (16 bits total) for input together to either first memory bank 16 or second memory bank 18 during a write cycle.

Figure 2:
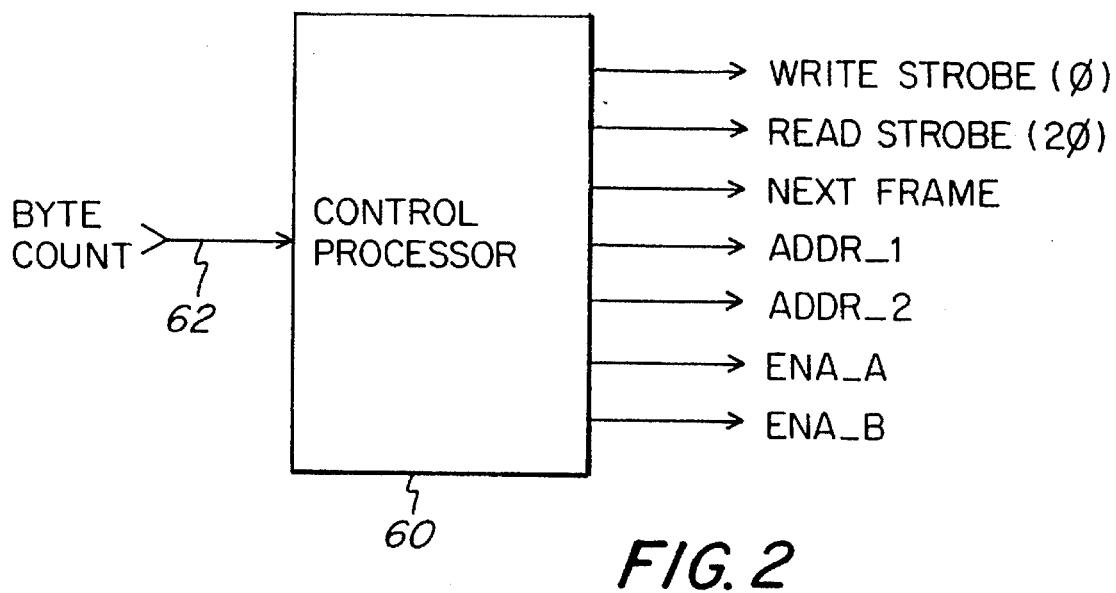
FIG. 2 is a block diagram illustrating a control processor for use in generating the various control signals used by the apparatus of FIGS. 1 and 6.

All of the pixels from a current frame are written into one of the memory banks, while the pixels from the previous frame are read out of the other memory bank. At the commencement of each new frame of incoming data, the memory banks are switched, so that at any instant of time the system will be writing into one of the memory banks while it is reading from the other. The memory bank to which data is written is controlled by a switch 14 that toggles every time a "next frame" signal is received from the system control processor 60 illustrated in FIG. 2. The control processor can identify each new frame by maintaining a count of the number of pixels ("bytes") received. Each frame contains the same number of pixels.

In the embodiments illustrated in the figures, two data streams are produced for each frame of incoming data. However, those skilled in the art will appreciate that any number N of data streams can be provided by simply increasing the number of bytes written into each memory location, and increasing the rate at which data is read from the memories by a factor of N with respect to the rate at which data is written into the memories. In the illustrated embodiments, the output of two data streams is achieved by writing two pixels into each memory location in response to a write strobe at rate $\phi$ which is half of the pixel rate (also the "read strobe" rate) $2\phi$. Thus, as noted above, at the input to switch 14, two consecutive pixels will be available simultaneously for storage in the appropriate memory bank at every write strobe.

In order to support two different scanning formats at the output, a separate read address generator is needed for each data stream format. The separate addresses are provided to the memory banks by control processor 60 via the ADDR_1 address port of the first memory bank 16 and the ADDR_2 address port of the second memory bank 18.

Figure 3:
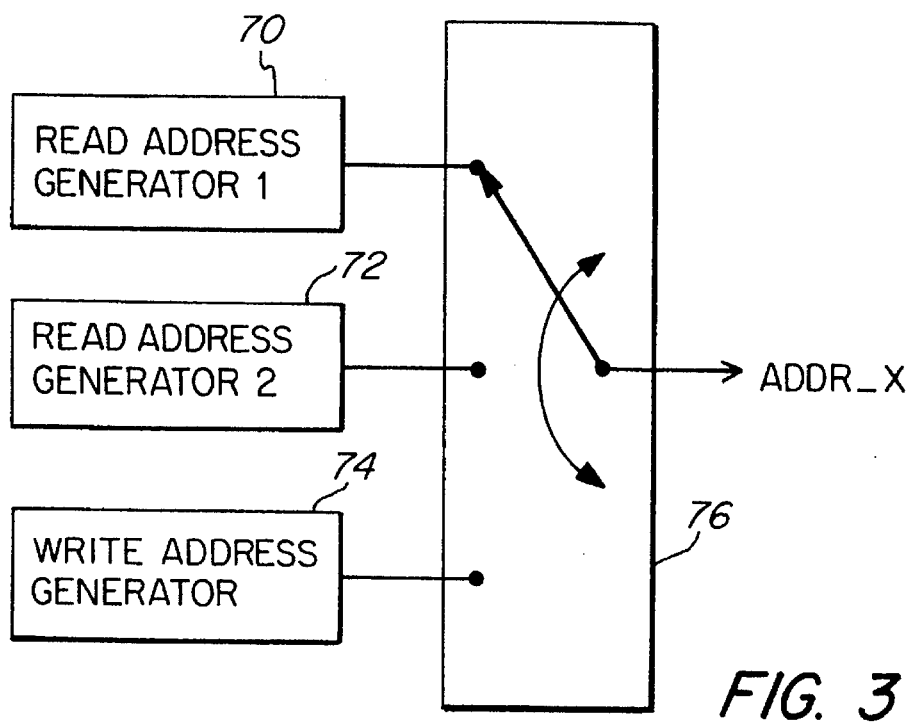
FIG. 3 is a block diagram illustrating circuitry for providing the various read and write addresses output by the control processor of FIG. 2.

FIG. 3 illustrates the generation of the different addresses by the control processor 60. In particular, control processor 60 will contain a first read address generator 70 and a second read address generator 72, as well as a write address generator 74 for each of the memory banks 16, 18. A multiplexer or switch 76 selects one of the outputs of address generator 70, address generator 72, or address generator 74 as the input to the ADDR_1 or ADDR_2 address port of first memory bank 16 or second memory bank 18, respectively. The write address generator is used to provide the write addresses for all data written into the memory banks. The first read address generator 70 is used to read data from the memory banks in the order necessary to provide the first output data stream (Data Stream 1). The second read address generator 72 is used to provide the addresses necessary to read data from the memory banks in the order required for the second output data stream (Data Stream 2). Since the read strobe is at twice the rate of the write strobe, the memory bank that is outputting data can be addressed to output two different sets of data for each set of data that is input to the memory currently storing data in response to the write strobe.

Additional hardware is required in order to assemble the two sets of data output from the outputting memory bank into the desired two different output data streams. This hardware includes a switch 20, which is the counterpart of switch 14 and selects which of the first and second memory banks will output data for the previously stored frame while the other memory is receiving data from the current frame. A buffering circuit generally designated 21 is provided for assembling the output data into the two separate data streams.

In the embodiment of FIG. 1, buffer circuitry 21 includes a first register 22 associated with Data Stream 1 and a second register 24 associated with Data Stream 2. The 16-bit pairs of pixels output each read strobe in response to the address provided to the outputting memory bank are input to both register 22 and register 24. However, the registers 22, 24 will only latch a pair of pixels when enabled. Register 22 is responsive to an ENA_A signal output from control processor 60 to latch a first pair of pixels and register 24 is responsive to an ENA_B signal output from control processor 60 to latch the second pair of pixels output from the outputting memory bank. The first and second pairs of pixels are output during two consecutive read strobes, corresponding to a single write strobe. Register 22 splits the 16 bits received from the outputting memory bank during a read strobe into its two eight-bit pixels. A data selector 26 toggles between the two eight-bit outputs of register 22 in order to serialize the individual pixels into Data Stream 1, which is output from terminal 27. Similarly, register 24 separates the 16-bit pair of pixels that it latches when enabled, into the two separate eight-bit pixel components thereof. A data selector 28 toggles between the two eight-bit outputs of register 24 to assemble the individual pixels into Data Stream 2, which is output via terminal 29.

Figure 4:
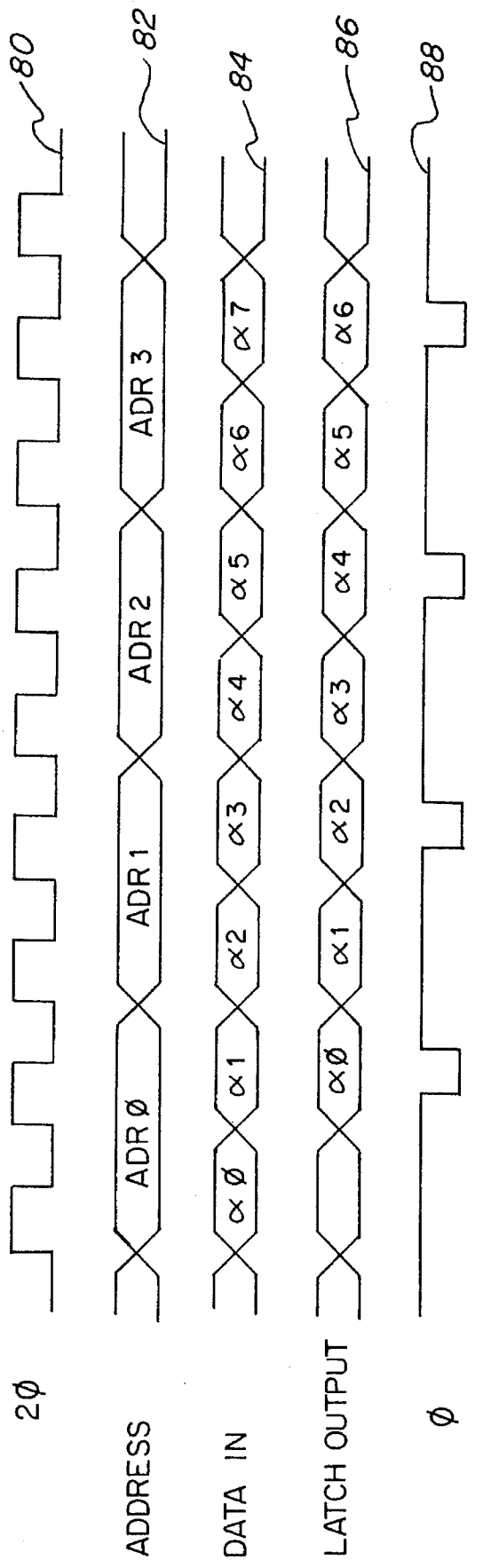
FIG. 4 is a timing diagram showing the various timing signals provided for writing data into a memory bank accordance with the present invention.
Figure 5:
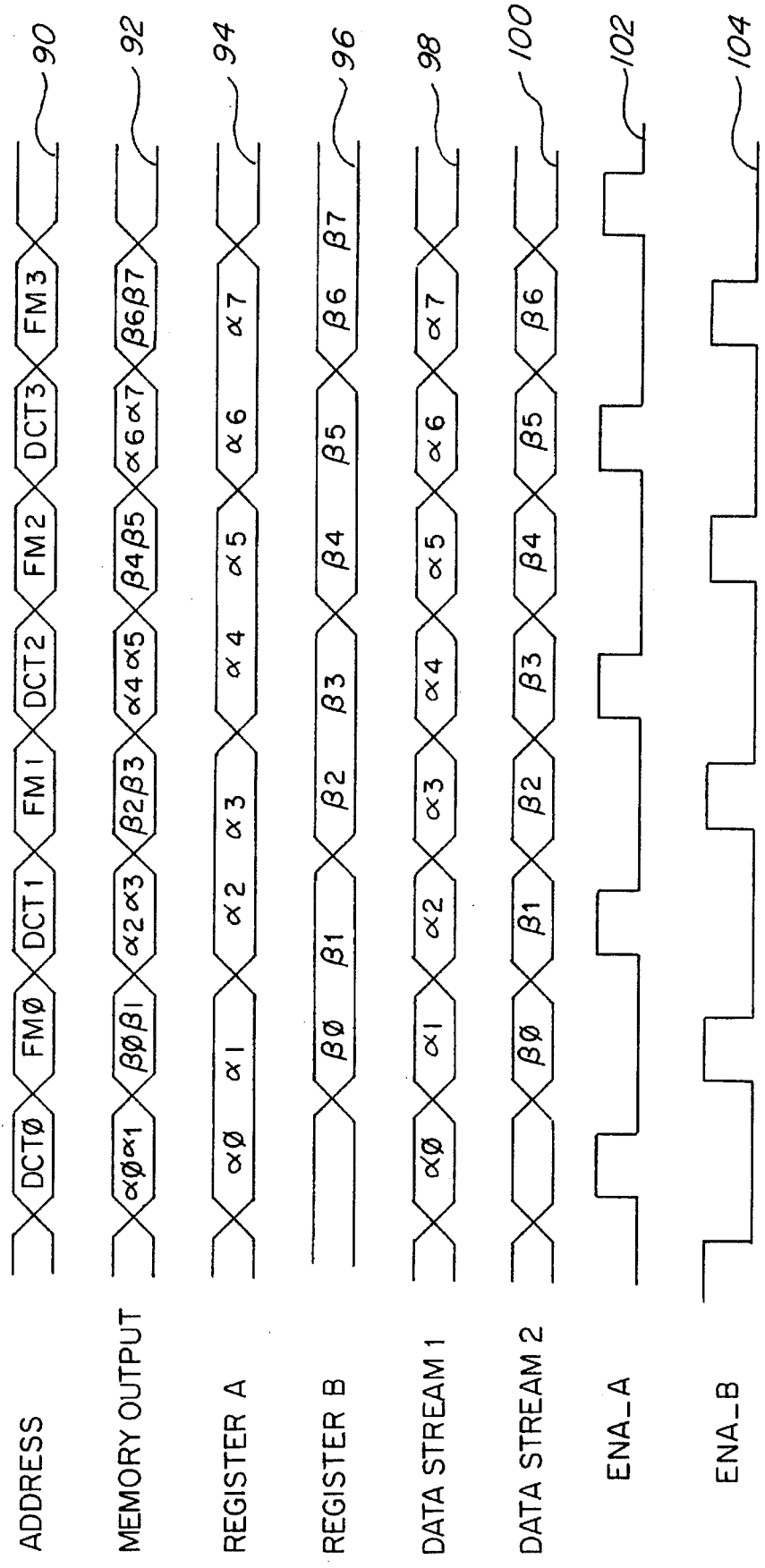
FIG. 5 is a timing diagram showing the various timing signals required to read data from a memory bank in accordance with the present invention.

The operation of the apparatus of FIG. 1 may be better understood by referring to the timing diagrams of FIGS. 4 and 5. FIG. 4 illustrates the timing used to write data into the memory bank 16 or 18 which is currently receiving data via switch 14. The write strobe 88 is provided at one-half the rate of the system clock 80. System clock 80 runs at a rate of $2\phi$, which is the same as the read strobe. A separate write address from a stream of write addresses 82 is provided during each write cycle for directing the two pixels present at the output of latch 12 into the next memory location of the receiving memory bank. Streams 84 and 86 illustrate that two pixels are written into each memory location during each write cycle. For example, during a first write cycle, pixels $\alpha 0$ and $\alpha 1$ are input at the memory location designated by address ADR0. During the next write cycle, pixels $\alpha 2$, $\alpha 3$ are stored at the memory location designated by ADR1. During the next write cycle, pixels $\alpha 4$, $\alpha 5$ are stored at the memory location designated by ADR2. Stream 84 is the data as input to terminal 10, and stream 86 is the data after delayed by one clock cycle by latch 12. It is clear from FIG. 4 that during each write strobe 88, two pixels are available for writing into the memory location designated by the current address 82.

After a frame of data has been stored in one of the memory banks, switches 14 and 20 are toggled so that the data can be read out of the memory bank while the next frame of data is written into the other memory bank. Instead of providing only one address 82 for every two clock cycles 80 as occurs during a memory write operation, a separate address is provided for each clock cycle during the read operation, as designated by 90 in FIG. 5. In the example illustrated, the first data stream will provide data in the necessary order for DCT processing, and the second data stream will provide data for processing in accordance with a film processing mode (FM). In order to accomplish this, every other address 90 provides data ordered for either DCT processing or film mode processing. Thus, for example, in response to read address DCT0, the memory that is currently outputting data will output pixels $\alpha 0$, $\alpha 1$ as illustrated at 90, 92 of FIG. 5. During the next read strobe, read address FM0 will address the memory bank that is currently outputting data. In response to the FM0 address, the memory bank will output pixels $\beta 0$, $\beta 1$ of the currently stored video frame. Then, at the next read strobe address DCT1 will be provided to the memory bank, which will respond by outputting pixels $\alpha 2$, $\alpha 3$. During the next read strobe, address FM1 will be provided to the memory bank, which will output pixels $\beta 2$, $\alpha 3$ in response. The process will continue, so that every other read strobe, either a pair of DCT pixels or a pair of film mode pixels will be output from the memory bank.

Register 22 will be enabled by the ENA_A signal to latch only the DCT ordered pixels which are output in response to the DCT addresses. This is illustrated at 94. Similarly, register 24 will be responsive to the ENA_B signal to latch only the pixels output from the memory bank in the film mode order in response to the film mode addresses. This is illustrated at 96 in FIG. 5. The ENA_A and ENA_B signals are illustrated at 102, 104, respectively, of FIG. 5.

Since register 22 will store only the pixels in the order output for DCT processing, the toggling of data selector 26 at the read strobe rate $2\phi$ will provide Data Stream 1 at output terminal 27 containing the consecutive pixels $\alpha 0$, $\alpha 1$, $\alpha 2$, $\alpha 3$... as illustrated at 98. In the same manner, data selector 28 will output Data Stream 2 at terminal 29, comprising the pixels in the order $\beta 0$, $\beta 1$, $\beta 2$, $\beta 3$, $\beta 4$... as illustrated at 100.

Since two pixels are written at each address location, addressing the memory banks at a write strobe rate of one-half the read strobe rate will not slow down the system throughput. Indeed, by writing two pixels in each address location, the present invention provides the capability of reading the data out in two different streams. The order of the data in each stream is controlled solely by the addresses provided to the outputting memory bank by the first read address generator 70 and second read address generator 72 illustrated in FIG. 3. These read address generators provide the address stream 90 illustrated in FIG. 5.

Figure 6:
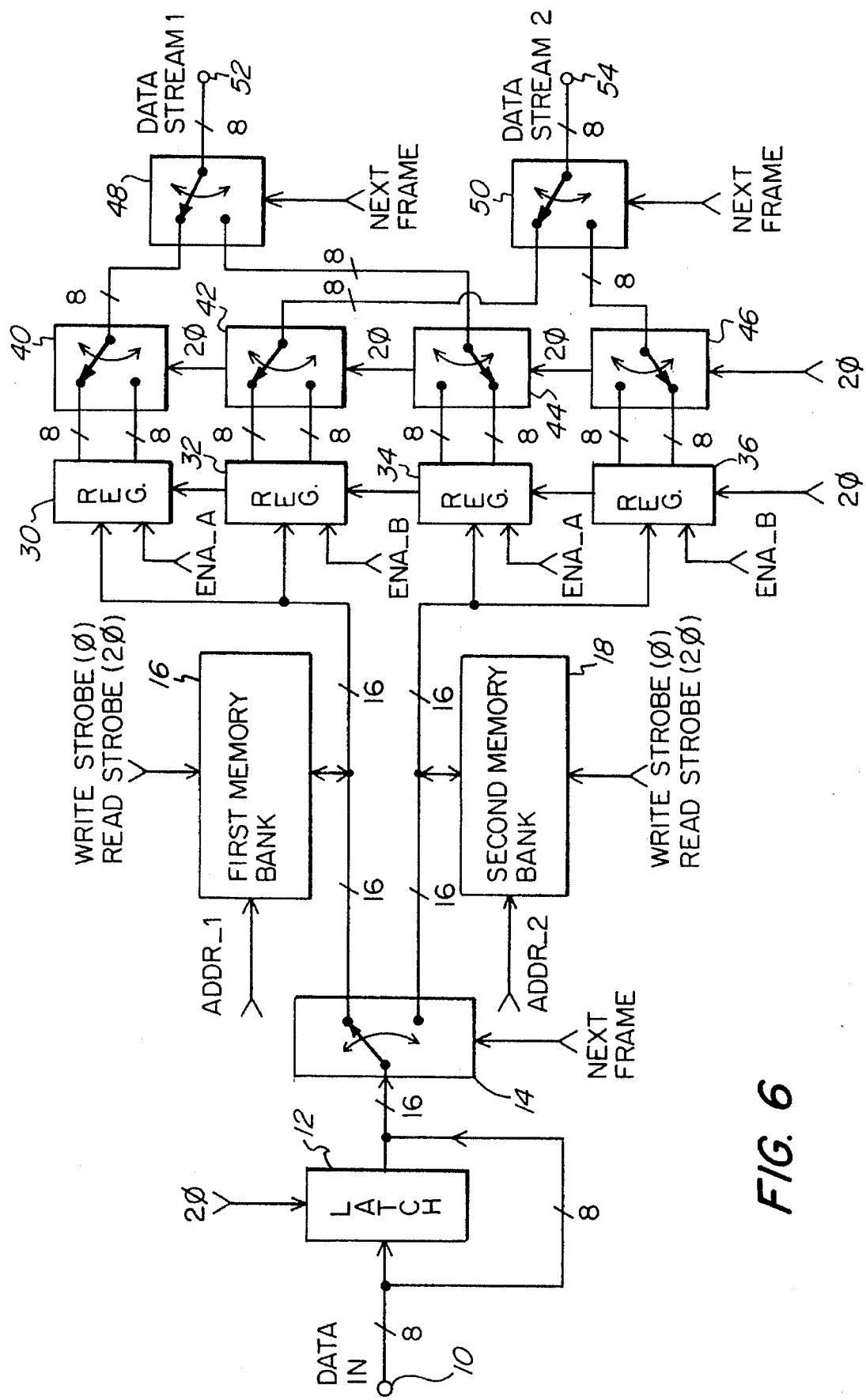
FIG. 6 is a block diagram of an alternate embodiment of apparatus in which separate output buffers are provided for each of the first and second memory banks.

FIG. 6 illustrates an alternate embodiment of the present invention, in which separate registers are provided for each of the first and second memory banks 16, 18, respectively. Thus, instead of providing switch 20 to direct the data from the outputting memory to common buffering circuitry 21, in the embodiment of FIG. 6 first memory bank 16 is associated with registers 30, 32 and second memory bank 18 is associated with registers 34, 36. The operation of registers 30, 32 and 34, 36 is the same as the operation of registers 22, 24 in the embodiment of FIG. 1. Each register is provided with either the ENA_A or ENA_B signal as well as the read strobe at the rate of $2\phi$. Each register has a data selector 40, 42, 44, or 46 associated with it in order to serialize the 16-bit pixel pairs into consecutive eight-bit pixels. Switches 48, 50, each responsive to the next frame signal from the control processor 60 (FIG. 2) output the respective data streams from the memory bank currently outputting data. In particular, when first memory bank 16 is outputting data, the pixels ordered in the appropriate order for Data Stream 1 will be output via terminal 52 from switch 48. When the second memory bank is outputting data, the pixels in the order for Data Stream 1 will continue to be output on terminal 52 via switch 48. On the other hand, switch 50 will output the pixels from first memory bank 16 in the order of Data Stream 2 via terminal 54. When the second memory bank is outputting data, switch 50 will couple the appropriately ordered pixels to terminal 54.

It should now be appreciated that the present invention processes successive frames of pixel data to provide N data streams containing the pixel data in different orders. Incoming frames of pixel data are alternately stored in a first memory bank at a rate of N pixels per write cycle while pixel data of a previous frame is output from a second memory bank at a rate of N pixels per read cycle. The read cycle has a rate of N times the write cycle to provide N, N-pixel sets of output pixels per write cycle. The pixels output from the memory banks for each of the N sets are buffered to provide the N data streams in the appropriate orders.

Although the invention has been described in connection with various specific embodiments, those skilled in the art will appreciate that numerous adaptations and modifications may be made thereto without departing from the spirit and scope of the invention as set forth in the claims. For example, the invention can be applied to process data other than digital video data. Further, as noted, any number of data streams can be provided by increasing the number of bytes stored in each memory location and providing a corresponding increase in the rate of the read strobe with respect to the write strobe.

I claim:

1. Apparatus for storing successive frames containing bytes of digital information and subsequently outputting an integer number N of different data streams for each frame, each of said N different data streams providing the same bytes for each or said frames but in a different order for subsequent processing, comprising:

first and second memory banks for respectively storing alternate ones of said successive frames, said first memory bank adapted to store bytes from an incoming frame while said second memory bank outputs bytes from a previous frame, and said second memory bank adapted to store bytes from an incoming frame while said first memory bank outputs bytes from a previous frame, wherein the previous frame bytes output by each memory bank are output in a plurality of different orders to provide said N different data streams for the previous frame;

means for controlling the inputting and outputting of bytes which represent said frames to and from said first and second memory banks, wherein said memory banks are responsive to read and write strobes and addresses provided by said controlling means for (i) storing incoming frame data in an order determined by write addresses at a rate of N bytes per write strobe and (ii) outputting N bytes of frame data specified by a read address for a next successive one of said N different data streams every read strobe, one write strobe occurring for every N read strobes, such that said output data bytes are provided in one of said plurality of different orders according to one of a corresponding plurality of different read address sequences; and means for buffering the outputted frame data for each of said N different data streams to provide one byte per read strobe in each of said data streams.

2. Apparatus in accordance with claim 1 wherein said controlling means comprise:

a write address generator and N read address generators for each memory bank;

means for coupling the write address generator for a memory bank to address that memory bank when the memory bank is receiving bytes from an incoming frame for storage; and means for sequentially coupling the N read address generators for a memory bank to address that memory bank when that memory bank is outputting bytes therefrom.

3. Apparatus in accordance with claim 2 comprising:

means for coupling said buffering means to said first and second memory banks in an alternating sequence to buffer data from one frame at a time.

4. Apparatus in accordance with claim 1 comprising:

means for coupling said buffering means to said first and second memory banks in an alternating sequence to buffer data for one frame at a time.

5. Apparatus in accordance with claim 4 wherein said buffering means comprise:

N registers, each of said registers being responsive to a respective enable signal generated by said controlling means for receiving N data bytes from the memory bank currently coupled to that register, the particular N data bytes being provided in response to a current read address; and N data selectors, each being associated with a respective one of said N registers for sequentially outputting each of the N data bytes from the associated register in response to successive read strobes N data selectors, each being associated with a respective one of said N registers for sequentially outputting each of the N data bytes from the register in response to successive read strobes; and means for multiplexing data bytes output from corresponding data selectors of the first and second memory banks.

6. Apparatus in accordance with claim 1 wherein said buffering means comprise, for each of said memory banks:

N registers coupled to the memory bank, each register responsive to a respective enable signal generated by said controlling means for receiving N data bytes from the memory bank, the particular N data bytes being provided in response to a current read address;

N data selectors, each being associated with a respective one of said N registers for sequentially outputting each of the data bytes from the register in response to successive read strobes; and means for multiplexing data bytes output from corresponding data selectors of the first and second memory banks; wherein said multiplexing means are coupled to said data selectors, and said N different data streams are output from said multiplexing means.

7. Apparatus in accordance with claim 1 wherein said frames are video frames and said bytes correspond to pixels of said video frames.

8. A method for processing successive frames of pixel data to provide an integer number N of different data streams, each of said N different data streams containing the same pixel data from each of said frames but in a different order, comprising the steps of:

alternately (a) storing incoming frames of pixel data in a first memory bank at a rate of N pixels per write cycle while outputting pixel data of a previous frame from a second memory bank at a rate of N pixels per read cycle, and (b) storing incoming frames of pixel data in a second memory bank at a rate of N pixels per write cycle while outputting pixel data of a previous frame from a first memory bank at a rate of N pixels per read cycle, wherein N read cycles occur for each write cycle such that N sets of N output pixels are output per write cycle; and buffering the pixels contained in each of said N sets to provide said N data streams, each of said N data streams containing the pixels from one of said sets;

wherein during each read cycle, the one of said first and second memory banks that is storing pixel data of a previous frame is addressed to provide a set of N output pixels for a next successive one of said data streams, said pixels being output in one of a plurality of different orders according to one of a corresponding plurality of different read address sequences.

9. Apparatus for processing successive frames of pixel data to provide two different data streams, each of said different data streams containing the same pixel data from each of said successive frames but in a different order, comprising:

address means for providing a plurality of sequences of read addresses;

means for grouping pixels from an incoming current video frame to provide successive pairs of pixels for storage in a first memory bank at a first clock rate t;

means responsive to said address means for reading stored pairs of pixels of a previous video frame from a second memory bank at a second clock rate 2t while the pairs of pixels from the current video frame are being stored in said first memory bank at rate t, said reading means providing two pairs of pixels from said previous video frame for each one pair of pixels stored from said current video frame; and means for combining the two pairs of pixels provided by said reading means into two data streams, each data stream providing pixels from said previous frame in a different order according to a corresponding one of said plurality of read address sequences.

10. Apparatus in accordance with claim 9 wherein said means for grouping pixels comprise:

a latch for delaying pixels from said incoming video frame by one clock cycle; and means for joining a delayed pixel from said latch with a next successive pixel in said incoming video frame to provide a pair of pixels.

11. Apparatus in accordance with claim 9 wherein said combining means comprise:

first and second output registers;

means for alternately inputting pairs of pixels provided by said reading means into said first output register and said second output register;

means for retrieving pixels one at a time from the first output register to provide one of said two data streams; and means for retrieving pixels one at a time from the second output register to provide the other one of said data streams.

12. Apparatus in accordance with claim 9 wherein said reading means comprise an address generator coupled to provide separate addresses to said second memory bank at said second clock rate $2\phi$, thereby providing two different pairs of pixels from said previous video frame for each one pair of pixels stored from said current video frame.

13. Apparatus in accordance with claim 9 further comprising switch means for alternatively coupling one of said first and second memory banks to receive pixels for storage while the other memory bank outputs pixels.

14. Apparatus in accordance with claim 13 wherein said combining means comprise:

first and second output registers coupled to receive pixels from said first memory bank;

means for alternately inputting pairs of pixels output from said first memory bank into said first output register and said second output register;

third and fourth output registers coupled to receive pixels from said second memory bank;

means for alternately inputting pairs of pixels output from said second memory bank into said third output register and said fourth output register;

means for retrieving pixels one at a time from the first and third output registers to provide one of said two data streams; and means for retrieving pixels one at a time from the second and fourth output registers to provide the other one of said data streams.

15. Apparatus in accordance with claim 14 wherein said reading means comprise an address generator coupled to provide separate addresses at said second clock rate $2\phi$ to the memory bank that is currently outputting pixels, thereby providing two different pairs of pixels from said previous video frame for each one pair of pixels stored from said current video frame.

16. Apparatus in accordance with claim 15 wherein said means for grouping pixels comprise:

a latch for delaying pixels from said incoming video frame by one clock cycle; and means for joining a delayed pixel from said latch with a next successive pixel in said incoming video frame to provide a pair of pixels.

17. Apparatus in accordance with claim 13 wherein said combining means comprise:

first and second output registers;

means for coupling both of said first and second output registers to receive pixels from the memory bank that is currently outputting pixels;

means for alternately inputting pairs of pixels output by the memory bank that is currently outputting pixels into said first output register and said second output register;

means for retrieving pixels one at a time from the first output register to provide one of said two data streams; and means for retrieving pixels one at a time from the second output register to provide the other one of said data streams.

18. Apparatus in accordance with claim 17 wherein said reading means comprise an address generator coupled to provide separate addresses at said second clock rate $2\phi$ to the memory bank that is currently outputting pixels, thereby providing two different pairs of pixels from said previous video frame for each one pair of pixels stored from said current video frame.

19. Apparatus in accordance with claim 18 wherein said means for grouping pixels comprise:

a latch for delaying pixels from said incoming video frame by one clock cycle; and means for joining a delayed pixel from said latch with a next successive pixel in said incoming video frame to provide a pair of pixels.

* * * * *

UNITED STATES PATENT AND TRADEMARK OFFICE
CERTIFICATE OF CORRECTION

PATENT NO. : 5,572,691
DATED : Nov. 5, 1996
INVENTOR(S) : R. Koudmani

It is certified that error appears in the above-identified patent and that said Letters Patent is hereby corrected as shown below:

Column 10, lines 8-14, in claim 5:
"N data selectors, each being associated with a respective one of said N registers for sequentially outputting each of the N data bytes from the register in response to successive read strobes; and
means for multiplexing data bytes output from corresponding data selectors of the first and second memory banks"
is deleted.

Signed and Sealed this

Fourteenth Day of April, 1998

Attest:

BRUCE LEHMAN

*Attesting Officer*          Commissioner of Patents and Trademarks